United States Patent

[11] 3,628,564

| [72] | Inventors | Irving N. Bishop |
| | | Farmington; |
| | | Louis L. Repko, Detroit, both of Mich. |
| [21] | Appl. No. | 863,173 |
| [22] | Filed | Oct. 2, 1969 |
| [45] | Patented | Dec. 21, 1971 |
| [73] | Assignee | Ford Motor Company |
| | | Dearborn, Mich. |

[54] FLUID FLOW CONTROL VALVE ASSEMBLY
12 Claims, 4 Drawing Figs.

[52] U.S. Cl. ................................................ 137/516.29,
137/538, 137/543.23, 251/332
[51] Int. Cl. ................................................ F16k 21/04
[50] Field of Search ........................................ 138/43, 46;
277/208, 209, 210, 211; 251/332, 333, 334;
137/516.25, 516.27, 516.29, 543.23, DIG. 3

[56] References Cited
UNITED STATES PATENTS

| 1,980,833 | 11/1934 | Sims | 137/514 X |
| 2,449,838 | 9/1948 | Brett et al. | 251/368 X |
| 2,511,733 | 6/1950 | Morrison | 138/43 |
| 3,185,438 | 5/1965 | Smirra | 251/332 X |
| 3,213,333 | 10/1965 | Mikina | 138/43 X |
| 3,305,211 | 2/1967 | Phillips | 251/368 X |
| 3,439,705 | 4/1969 | Simko | 137/516.27 X |

Primary Examiner—Herbert F. Ross
Assistant Examiner—David J. Zobkiw
Attorneys—John R. Faulkner and Roger E. Erickson ABSTRACT: A retraction-type delivery valve assembly for a fuel injection system of an internal combustion engine. The assembly controls fuel flow through and pressure within an adjoining injecting line. The assembly includes a spool valve received in a bore of the valve body and having an enlarged head portion which abuts a portion of the valve body in one direction of movement of the valve. A plurality of substantially concentric microgrooves are formed in the valve body about the spool valve bore. The head portion of the spool valve includes a plastic sealing disc formed with a plurality of corresponding microgrooves that matingly engage the microgrooves of the valve body when the valve assembly is closed.

INVENTORS
IRVING N. BISHOP
LOUIS L. REPKO
BY JOHN R FAULKNER
ROGER E ERICKSON
ATTORNEYS

FLUID FLOW CONTROL VALVE ASSEMBLY

BACKGROUND OF THE INVENTION

This invention relates generally to a fluid flow control apparatus. More particularly, it relates to a retraction-type delivery valve for use in a fuel injection system of an internal combustion engine.

Direct fuel injection systems of the type to which invention is directed generally have a number of reciprocating pump plungers each intermittently supplying a charge of fuel past a delivery valve through an injection line to an injection nozzle. The delivery valve is provided for a number of reasons. One is to permit the passage of only highly pressurized fluid from the pump plunger cavity to the injection line and to prevent the back flow of liquid or gas from the injection line to the pump plunger cavity. Another function is to cause a rapid reduction in injection line pressure so that the injector needle can rapidly snap shut thereby preventing dribbling or secondary injection.

A more detailed discussion of the functions of a delivery valve are presented in U.S. Pat. No. 3,439,705.

Delivery valves presently known in the art commonly incorporate conically shaped sealing surfaces between the valve bodies and the movable valve elements. Such delivery valves are made with very close tolerances making them expensive to produce. Furthermore, the sealing surfaces of many of the prior art devices are often required to be hand-lapped together to insure proper sealing. One improvement over such prior art devices is shown in U.S. Pat. No. 3,439,705 which describes the use of a compressible seal between the valve element and the valve body. Another improvement is provided by this invention in which the generally flat sealing surfaces are grooved with corresponding concentric microgrooves and in which one of the sealing surfaces is metallic and the other is of a polymeric material.

This invention also provides a delivery valve construction having parallel sealing surfaces between the valve and the valve body which do not require lapping to provide essentially leakproof sealing.

Still further, the invention provides both a circumferential and radial labyrinth seal effect between the parallel surfaces. The invention also provides a sealing surface deformable to absorb a small metal chip or other foreign particle without destroying sealing capability. The invention further provides a delivery valve construction hat is both economical to produce and maintain, as well as reliable in operation.

BRIEF DESCRIPTION OF THE INVENTION

A valve assembly constructed in accordance with this invention includes a body element having a passage and a valve seat formed therein and a movable valve element sealingly engageable with the seat to close the passage. One of the elements has a plurality of generally circular grooves formed therein. The other element has a plastic surface having a plurality of corresponding grooves formed therein matingly engageable with the grooves of the first element upon valve closure.

DETAILED DESCRIPTION OF The PREFERRED EMBODIMENT

Figure 1:
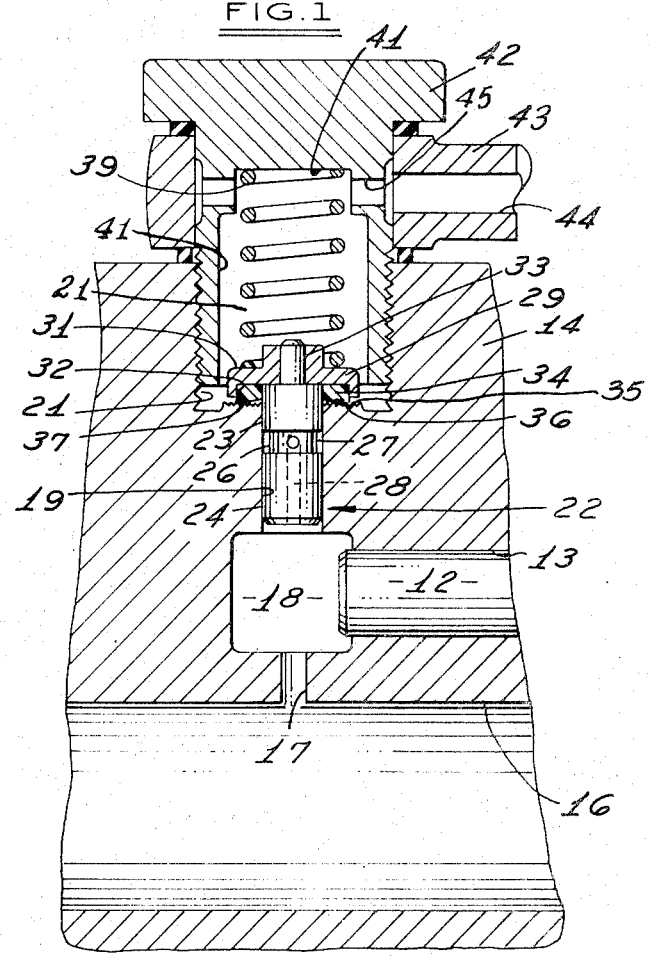
FIG. 1 shows a cross-sectional view of a portion of the fuel injection pump and the included delivery valve assembly.

FIG. 1 shows a cross-sectional view of a portion of a fuel injection pump such as that shown in U.S. Pat. No. 3,319,568. The pump includes a number (only one shown) of plungers 12 reciprocable in bores 13 in the pump housing 14 by a wobble plate or other suitable mechanism (not shown). A central bore 16 of the pump would contain an axially slideable metering valve (not shown) fixed on a shaft that is rotatable with the pump drive means (not shown). The bore contacting surface of the valve would contain suitable fuel flow channels so disposed during each rotation of the metering shaft, fuel would be delivered through the channels from a source (not shown) to spill holes or passages 17 in a known manner.

The number os spill holes 17 correspond to the number of pump plungers 12. Each of the spill holes opens into a pump plunger cavity 18 that is intersected on the opposite side by a bore 19 which, in turn, opens into an enlarged annular chamber 21 within the pump housing 14.

The flow of fuel from pump plunger cavity 18 through chamber 21 to the fuel injector (not shown) is controlled by delivery valve 22 that is slideably and sealingly mounted in bore 19. The valve is of the spool type having two axially spaced lands 23 and 24 of the same diameter interconnected by a neck portion 26 of a reduced diameter. The neck portion together with the wall of the bore 19 and the adjacent land sides constitute an annular fuel collection chamber 27. A passage 28 is formed within he valve which supplies chamber 27 with fuel from pump cavity 18.

Land 23 constitutes a fuel flow shutoff member and a volume retraction collar, when it is in the position shown within bore 19. When the valve moves upwardly as shown in FIG. 1 sufficiently to move land 23 out of bore 19, fuel flows freely from chamber 17 and passage 28 into the larger injection chamber 21.

Figure 2:
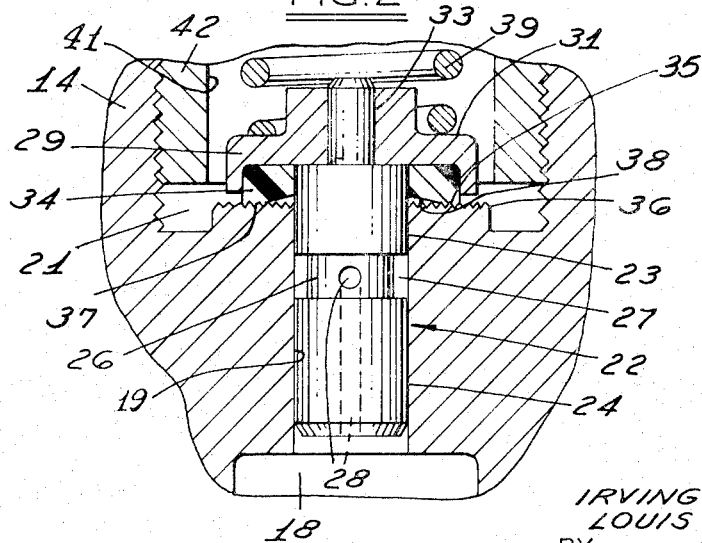
FIG. 2 is an enlarged cross-sectional view of a portion of the delivery valve assembly showing the microgrooves formed in the sealing members.

A retaining ring 29 having a shoulder portion 31 on one axial side and an annular recess 32 formed on the other axial side is secured to an upper neck portion 33 of the spool valve 22. A sealing disc 34 is received within the annular recess and has an axial dimension greater than the axial depth of the recess 32. The sealing disc is engageable with the valve seat portion 35 of the injection chamber wall surrounding the bore 19. A plurality of substantially concentric, annular grooves 36 having preferably a 4 to 20 microinch surface finish and no groove of a depth greater than 0.002 inch are cut into valve seat 35. Corresponding grooves 37 are formed in the lower side of the sealing element 34 which are engageable with the grooves 36. A conical recess 38 is formed in the sealing disc so that the disc engages the chamber surface at the outer circumferential portion of the disc and is spaced apart at the radially inner portion of the disc. This causes increased unit pressure at the surface of disc 34 that engages seat 35. The relative size of the grooves shown in FIGS. 1 and 2 are exaggerated in size for purposes of illustration.

Shoulder 31 of the retaining ring 29 provides a seat for one end of a compression or valve return spring 39. The other end of the spring is seated against the upper end of a cup-shaped bore 41 formed in adapter 42, which is threaddedly connected to the pump housing 14. A banjo-type fitting 43 having a passage 44 formed therein is positioned about the adapter and communicates with bore 41 and chamber 21 by means of passage 45 formed in the adapter. The outer end of the fitting 43 has means (not shown) for connection with a hose or injection line connected to a fuel injector nozzle (not shown). The injector would be of a known type and remains closed below a predetermined fuel pressure in cavity 18 and bore 19.

During the initial leftward movement of the plunger 12, the metering shaft (not shown) in bore 16 is in a position to cause a spilling of fuel from cavity 18 out through hole 17 into the central metering shaft bore 16. As the pump plunger continues to move leftwardly, the valve in the metering shaft bore rotates to a position closing off spill hole 17. This permits a buildup in pressure of the fuel in cavity 18 and against the end of valve land 24. As soon as the magnitude of the fuel pressure surpasses the force of spring 39 plus the residual pressure in chamber 24, delivery valve 22 will move upwardly as shown in FIG. 1. This will move retraction collar or land 23 out of bore 19, unseat sealing disc 34 and interconnect the cavity 18, passage 28 and chamber 27 and 21, passages 45 and 44 and the injection nozzle (not shown).

When the pumping stroke of the plunger 12 is complete and it begins its suction or return stroke, the pressure in the cavity 18 will immediately decay. This is due not only to the expansion of the fuel into the plunger bore 19, but also because the metering shaft valve (not shown) now will be in a position connecting spill holes 17 to bore 16. Thus, the pressure in chamber 21 and the force of spring 58 will move the delivery valve 22 downwardly toward a closed position. As the valves moves downwardly, the fuel pressure in the injection line 44 will decay and permit the closing of the injection nozzle (not shown). Essentially at the same time, the lower edge of retraction collar 23 will contact the upper edge of bore 19 and stop the flow of fuel from fuel injection chamber 21 back to the pump cavity 18. Except for any slight leak around the outer periphery of land 23, the pressure of the fuel in line 44 is now essentially the same as that at the fuel injection nozzle.

With the further decay in fuel pressure in pump plunger cavity 18, delivery valve 22 continues to move downwardly until the disc 36 seats against the adjacent pump housing portion causing microgrooves 36 and 37 to engage and to provide leakproof sealing. The travel of the retraction collar 23 is now stopped.

To assure that microgrooves 36 and 37 formed in the valve seal 35 and the sealing disc 34, respectively, are appropriately matched, the following method of forming may be used. Microgrooves 36 are first cut into a polished surface of valve seat 35 using a rotary cutting tool having a pilot end centered and aligned by bore 19. Fine sandpaper provides a cutting surface for the rotary tool suitable to obtain a circular lay about bore 19 having a 4 to 20 microinch vms surface roughness. The movable valve assembly, including elements 22, 29 and 34, is rotated against grooves 36 formed in valve seat 35. Because of the inherent creep properties of the sealing disc material, corresponding grooves 37 are formed in the sealing disc 34 by the axial pressure and rotation against the microgrooves in the valve seat. It is important that the valve seat surface and the sealing surface of the disc are parallel prior to the forming of the grooves 36 and 37.

The sealing disc 34 is preferably made of an elastomeric material, resistant to internal combustion engine fuels, having substantially identical properties to polytetrafluoroethylene or Teflon. In general, polymeric materials such as polyfluorocarbons having suitable creep characteristics may be used.

In theory, the most effective sealing would occur when the disc grooves 37 mate with the identical grooves 36 as in the forming process, described previously. As a practical matter, manufacturing tolerances prevent the consistent mating of identical grooves upon each valve closing. However, it has been found that substantially concentric grooves provide significantly more effective sealing is spite of the manufacturing tolerances than does multidirectional or parallel lays. This may be explained by the fact that the Teflon or Teflonlike grooves 37 are sufficiently deformable to substantially mate the valve seat grooves 36 and form a series of labyrinth seals even though the microgrooves may deviate slightly from theoretical circularity and concentricity.

While the invention has been shown and described in the preferred embodiment, it will be clear to those skilled in the art to which the invention pertains that many changes and modifications may be made thereto without departing from the scope of the invention.

We claim:

1. A retraction-type delivery valve assembly for use with a fuel pump having a pump plunger cavity and an injection chamber interconnected to each other comprising,
    a spool valve slidable sealingly in a conduit connecting said cavity and chamber and having an end portion of a larger diameter than said conduit projecting into said chamber to limit movement of said valve in one direction,
    said valve having spaced lands defining a fluid chamber therebetween,
    passage means connecting said cavity and fluid chamber,
    and seal means between said end portion and one of said lands moving with said end portion into a sealing engagement with a portion of said injection chamber,
    said one land constituting an injection chamber volume control element movable alternatively into and out of said injection chamber upon movement of said valve to control flow of fluid under pressure from said passage means and fluid chamber to said injection chamber and to seal flow therebetween and control the retraction of a volume of said valve from said injection chamber,
    said seal means comprising a disclike member of a polymeric material having a plastic properties,
    a plurality of generally circular microgrooves formed in said injection chamber portion,
    a plurality of corresponding microgrooves formed in said seal means and being engageable and mateable to form a seal with said first-mentioned microgrooves,
    said microgrooves being contained in essentially flat surfaces of said injection chamber and said seal means.

2. A delivery valve assembly according to claim 1 and including:
    the grooved side of said seal means having a centrally disposed depression spaced apart from said first-mentioned microgrooves.

3. A delivery valve assembly according to claim 2 and including:
    said microgrooves being substantially concentrically disposed about the axis of said spool valve.

4. A delivery valve assembly according to claim 1 wherein:
    said seal means comprises a polytetrafluoroethylene material,
    said microgrooves being substantially concentrically disposed about the axis of said spool valve.

5. A delivery valve assembly according to claim 1 and including:
    said end portion including a ring member having an axially extending ring flange defining a hollow with said ring member,
    said seal means being contained within said hollow.

6. A valve assembly comprising:
    a body element having a passage and a valve seat formed therein,
    a reciprocal valve element sealingly engageable with said seal to close said passage,
    the engageable portions of said elements comprising essentially plane surfaces,
    said engageable portions having a plurality of generally circular microgrooves formed therein being substantially interengageable and mateable to form a seal therebetween,
    said engageable portions of said valve elements being constructed respectively of materials having differential hardness and plasticity characteristics.

7. A valve assembly according to claim 6 wherein said microgrooves are substantially concentric.

8. A valve assembly according to claim 6 wherein one of said engageable portions comprises a polymeric composition which is resilient to internal combustion fuels and has mechanical properties substantially identical to polytetrafluoroethylene.

9. A valve assembly according to claim 6 wherein one of said engageable portions is comprised of a metallic material and the other of said engageable portions is comprised of polytetrafluoroethylene.

Figure 3:
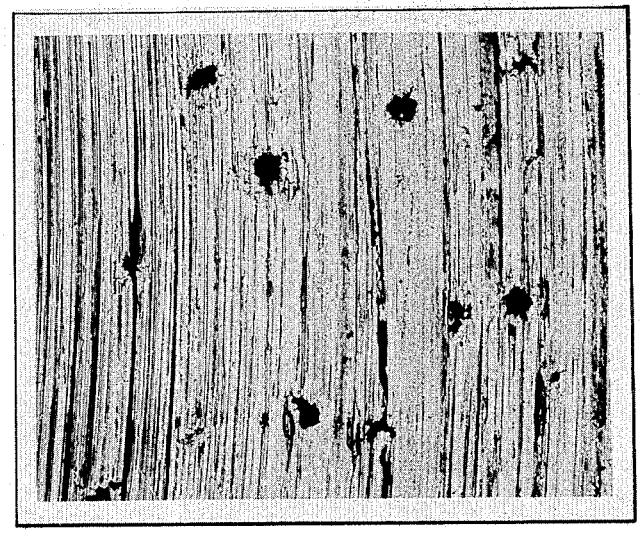
FIG. 3 is a 200X photomicrograph of a portion of valve seat 35 showing grooves 36 formed in nodular iron pump housing 14.

10. The valve assembly of claim 9 wherein the circular microgrooves formed in the metallic material are metallographically indistinguishable from those depicted in FIG. 3 of the drawings.

Figure 4:
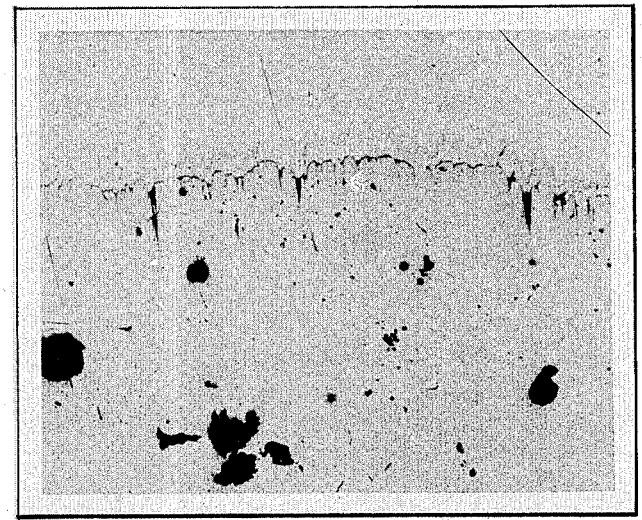
FIG. 4 is a 200X photomicrograph of a polished section of valve seat 35. The dark irregular line in the photomicrograph is approximately a 2000X representation of the depth of grooves 36 and a 200X representation of their width. The groove depth representation is 10 times greater than the groove width because the section is cut at about 5° to 6° from he plane of valve seat 35. Thus, when perpendicularly viewing the plane of the section, the irregular line represents the actual magnification of the width of the grooves and the cosecant of 5° to 6° times the actual magnification of the groove depth or approximately 10X.

11. The valve assembly of claim 9 wherein the circular microgrooves formed in the metallic material are metallographically indistinguishable from those depicted in FIG. 4 os the drawings.

12. A valve assembly comprising:

a body element having a passage and a valve seat formed therein, a movable valve element sealingly engageable with said seat to close said passage, each of the engageable portions of said elements having an essentially flat surface of 4 to 20 microinch surface roughness with a circular lay, said engageable portions forming a set of substantially interengageable and mateable microgrooves.

said engageable portions of said valve elements being constructed respectively of materials having differential hardness and plasticity characteristics.

* * * * *